(12) United States Patent
Malfa et al.

(10) Patent No.: US 9,303,594 B2
(45) Date of Patent: Apr. 5, 2016

(54) INTERNAL COMBUSTION ENGINE

(71) Applicant: Speed of Air, Inc., Reno, NV (US)

(72) Inventors: Joey Malfa, Reno, NV (US); Jess McFarlen, Reno, NV (US); Mitchell E. Wagner, Reno, NV (US); Eric D. Robinson, Reno, NV (US)

(73) Assignee: SPEED OF AIR, INC., Reno, NV (US)

( * ) Notice: Subject to any disclaimer, the term of this patent is extended or adjusted under 35 U.S.C. 154(b) by 0 days.

(21) Appl. No.: 14/338,252

(22) Filed: Jul. 22, 2014

(65) Prior Publication Data

US 2014/0326224 A1 Nov. 6, 2014

Related U.S. Application Data

(63) Continuation of application No. 13/142,960, filed as application No. PCT/US2009/069869 on Dec. 30, 2009, now Pat. No. 8,813,718.

(60) Provisional application No. 61/141,987, filed on Dec.
(Continued)

(51) Int. Cl.
*F02M 25/07* (2006.01)
*F02M 27/08* (2006.01)
*F02B 23/08* (2006.01)
*F02M 29/14* (2006.01)

(52) U.S. Cl.
CPC ............... *F02M 25/07* (2013.01); *F02B 23/08* (2013.01); *F02M 27/08* (2013.01); *F02M 29/14* (2013.01); *Y02T 10/125* (2013.01); *Y02T 10/146* (2013.01)

(58) Field of Classification Search
CPC . Y02T 10/125; Y02T 10/146; F02B 23/0618; F02B 23/0678; F02B 23/0621; F02M 27/08

USPC ......... 123/559.1, 184.21, 306, 307, 308, 659, 123/660, 671
See application file for complete search history.

(56) References Cited

U.S. PATENT DOCUMENTS 1,288,640 A * 12/1918 Mauck ................. 123/184.39
1,305,174 A *  5/1919 Smith ................. 123/184.39
(Continued)

FOREIGN PATENT DOCUMENTS

JP          H1182860 A1 *  3/1999  ............... E03F 5/04

OTHER PUBLICATIONS

Unknown, "Techlines ", Dec. 1998, 2 pages.
(Continued)

*Primary Examiner* — Hieu T Vo
*Assistant Examiner* — Arnold Castro
(74) *Attorney, Agent, or Firm* — Lewis Roca Rothgerber Christie LLP

(57) ABSTRACT

An internal combustion engine includes a combustion chamber defined by a cylinder, a piston defining a piston top, a cylinder head with an intake port and an exhaust port, and a corresponding intake valve and an exhaust valve. The internal combustion engine further includes an intake manifold for supplying air to the combustion chamber and an exhaust manifold for drawing exhaust gas from the combustion chamber. The flow dynamics of the internal combustion engine are improved by including textured surfaces on one or more of the piston top, the cylinder head, the intake valve, the intake port, the exhaust valve, the intake manifold, the exhaust manifold, or the fuel supplier. The textured surface may include indentations, protrusions, or combinations.

19 Claims, 9 Drawing Sheets

Related U.S. Application Data 31, 2008, provisional application No. 61/150,600, filed on Feb. 6, 2009, provisional application No. 61/150,605, filed on Feb. 6, 2009, provisional application No. 61/150,607, filed on Feb. 6, 2009.

(56) References Cited

U.S. PATENT DOCUMENTS

| | | | |
|---|---|---|---|
| 1,543,155 | A | 6/1925 | Fradet |
| 2,384,681 | A | 9/1945 | Janes |
| 2,800,100 | A | 7/1957 | Boucher |
| 2,882,106 | A | 4/1959 | Meurer |
| 3,025,839 | A | 3/1962 | Crowther et al. |
| 3,914,353 | A | 10/1975 | Cherry |
| 4,316,580 | A | 2/1982 | Bodai |
| 4,572,123 | A | 2/1986 | Evans |
| 4,617,888 | A | 10/1986 | Dent |
| 4,968,458 | A | 11/1990 | Besnia |
| 4,976,248 | A | 12/1990 | Rowe |
| 5,140,966 | A | 8/1992 | Wong |
| 5,525,266 | A | 6/1996 | Thompson |
| 5,632,145 | A * | 5/1997 | Hunt ................. 123/184.21 |
| 5,950,585 | A | 9/1999 | Sarcarto |
| 5,970,963 | A | 10/1999 | Nakase et al. |
| 6,047,956 | A | 4/2000 | Brazina |
| 6,170,454 | B1 | 1/2001 | McFarland et al. |
| 6,237,579 | B1 | 5/2001 | Singh |
| 6,371,095 | B1 | 4/2002 | Sacarto |
| 6,609,490 | B2 | 8/2003 | Flinchbaugh et al. |
| 6,874,998 | B2 | 4/2005 | Roby |
| 7,198,024 | B2 | 4/2007 | Coleman et al. |
| 7,278,389 | B2 | 10/2007 | Kirakosyan |
| 2003/0089329 | A1 | 5/2003 | Flinchbaugh et al. |
| 2003/0160341 | A1 | 8/2003 | Satterfield |
| 2005/0241605 | A1 | 11/2005 | Bedwell et al. |
| 2006/0180115 | A1 | 8/2006 | Rubert |
| 2007/0022982 | A1 * | 2/2007 | Genise et al. .......... 123/41.82 R |
| 2007/0079801 | A1 | 4/2007 | Aw |
| 2008/0145211 | A1 | 6/2008 | Foale |
| 2011/0139114 | A1 | 6/2011 | Nakazawa et al. |
| 2011/0162614 | A1 | 7/2011 | Lapp et al. |
| 2012/0060802 | A1 | 3/2012 | Livingston |
| 2013/0014720 | A1 | 1/2013 | Kim |

OTHER PUBLICATIONS

Unknown, Techlineforum.com, "Onyx Turbocharger Services", Aug. 10, 2010, 9 pages.

International Search Report and Written Opinion of the International Searching Authority, dated Mar. 8, 2011, for PCT/US2009/069869, 7 pages.

International Preliminary Report on Patentability, dated Mar. 25, 2011, for PCT/US2009/069869m, 8 pages.

* cited by examiner

Turbocharger Boost Pressure

- - - - - Baseline Test
——— Modified Test

Throttle Input Voltage

- - - - - Baseline Test
——— Modified Test

ENGINE MAPPING

INTERNAL COMBUSTION ENGINE

CROSS-REFERENCE TO RELATED APPLICATIONS

This application is continuation of U.S. patent application Ser. No. 13/142,960, filed Jun. 30, 2011, which is a National Phase Patent Application and claims the priority to and the benefit of International Application Number PCT/US2009/069869, filed on Dec. 30, 2009, which claims priority to and the benefit of U.S. Provisional Patent Application Ser. Nos. 61/141,987, filed Dec. 31, 2008 and 61/150,600, 61/150,605, and 61/150,607, filed Feb. 6, 2009.

BACKGROUND OF THE INVENTION

This invention is directed to methods and apparatus for improving the flow dynamics and thermal characteristics inside an internal combustion engine.

SUMMARY OF THE INVENTION

In particular, this invention provides modifications to an internal combustion engine which can provide benefits that include one or more of improving the flow dynamics of the intake system, combustion chamber and exhaust system, increasing air flow, providing better fuel atomization and homogenization, achieving higher engine efficiency. Additionally, this invention can provide increased thermal control of the air passing through the intake, combustion chamber and exhaust system, which can reduce extreme temperature swings and provide increased power output with less fuel consumption.

An internal combustion engine according to an embodiment of the invention includes a combustion chamber. For purposes of this specification, the combustion chamber may generally be defined by a piston top, a cylinder head defining an intake port and an exhaust port, an intake valve corresponding to the intake port, and an exhaust valve corresponding to the exhaust port. While the embodiments of the invention illustrated here generally refer to a single cylinder of an internal combustion engine, it should be appreciated that the concepts apply to multiple cylinder internal combustion engines. Furthermore, while each cylinder is generally described as having a single intake port and a single exhaust port, the technology may be applied to engines having multiple intake ports or multiple exhaust ports per cylinder. Moreover, while the embodiments generally illustrate intake and exhaust valves associated with each intake and exhaust port, the technology may also be applied to internal combustion engines such as two-cycle engines that operate without valves.

The internal combustion engine further includes an intake manifold for supplying air to the combustion chamber and an exhaust manifold for drawing exhaust gas from the combustion chamber. A fuel supplier comprising one or more fuel injectors or one or more carburetors supplies fuel to the combustion chamber of the internal combustion engine. The flow dynamics of the internal combustion engine are improved by including textured surfaces on at least one of the piston top, the cylinder head, the intake valve, the intake port, the exhaust valve, the intake manifold, the exhaust manifold, or the fuel supplier. According to certain embodiments, the shapes forming the textured surface may be indentations, protrusions, or combinations. Particular textured surfaces may be dimples, prismatic shapes, pyramidal shapes, polyhedral shapes, conical shapes, portions of such shapes or combinations of such shapes.

In another embodiment of the invention, the internal combustion engine further includes a plurality of grooves generally located about the perimeter of a squish band defined by the cylinder head. In still other embodiments, the textured inner surface further comprises a plurality of helical grooves located at an interface between the intake manifold and the intake port, and an interface between the exhaust manifold and the exhaust port. In still other embodiments, the internal combustion engine includes an air pressure booster such as a turbocharger or a supercharger where one or both of the compressor wheel and the turbine wheel are modified to include vanes with rounded edge surfaces to improve the flow characteristics. Such air pressure boosters can also include tapered wall surfaces on one or more of an air inlet, a compressor outlet, a exhaust gas inlet, and an exhaust gas outlet to further improve the flow characteristics through the air pressure booster.

In still other embodiments, one or more of the surfaces of the internal combustion engine are coated with thermal barrier coatings to improve the heat transfer characteristics of the internal combustion engine, contributing to improved performance.

The features of the invention change the surface physics of the intake system, combustion chamber and exhaust system to decrease the disruption of air flow and increase the speed of the air-fuel mixture. When the surfaces of the intake tracks are modified according to the invention, the increase of the speed of air or exhaust can provide benefits that include increasing the horsepower and torque of the engine at a lower throttle input with lower fuel consumption. These modifications can also reduce the tendency for fuel to liquefy inside the intake track and combustion chamber. By mitigating the re-liquefaction of atomized fuel, burn efficiency is increased and hydrocarbon emissions are decreased.

The improved flow and inclusion of thermal barrier coatings together help to control the temperatures of both the intake air and exhaust streams to further improve the combustion process. Features of the invention contribute to a resultant combustible air-fuel mixture that is close to 14.7:1 which is considered optimal for many internal combustion engines.

BRIEF DESCRIPTION OF THE DRAWINGS

The accompanying drawings, together with the specification, illustrate various aspects and embodiments of the invention.

DETAILED DESCRIPTION OF THE INVENTION

Figure 1:
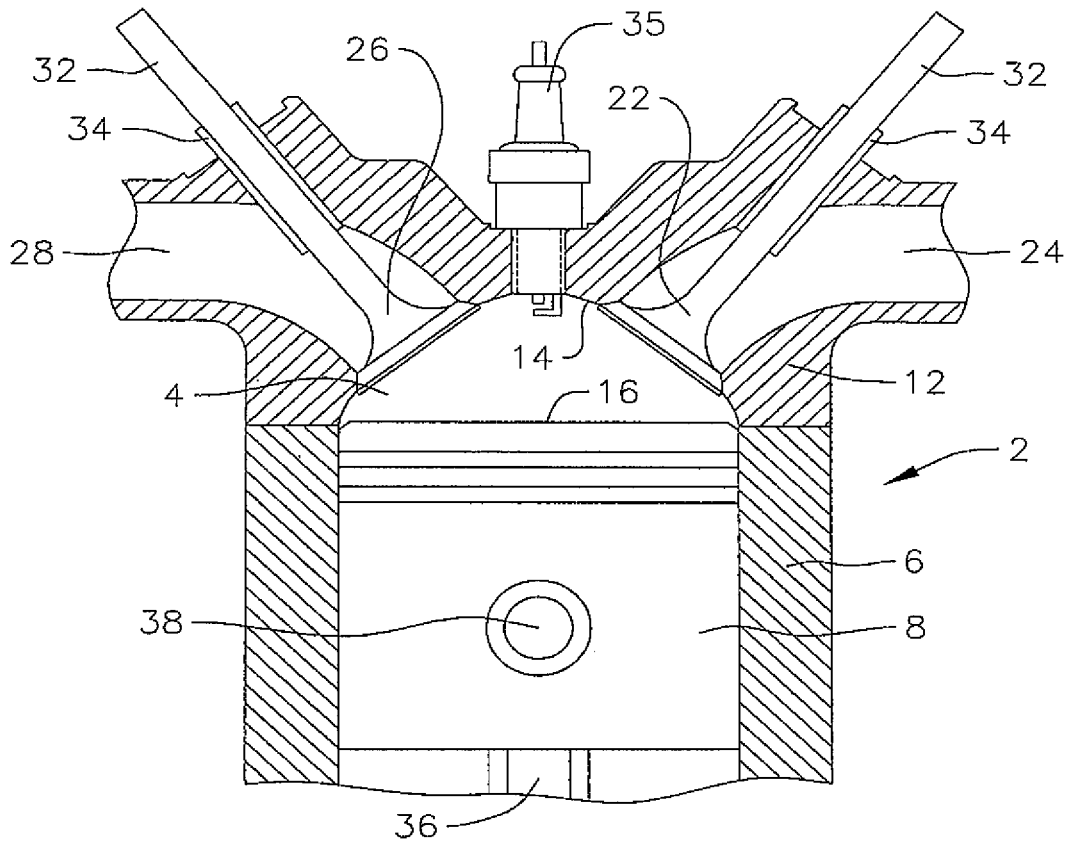
FIG. 1 is a schematic cross sectional diagram illustrating a combustion chamber of an internal combustion engine.

This technology helps to mitigate the formation of turbulent vortices or low pressure areas that disrupt the intake track and the flow of fuel and air in a combustion chamber of a typical internal combustion engine. FIG. 1 is a schematic sectional view of an internal combustion engine 2 illustrating a combustion chamber 4 associated with a cylinder 6 of a multiple cylinder internal combustion engine. It should be noted that the internal combustion engine illustrated is a four-cycle spark ignition engine, but features of the invention may be applied to any internal combustion engine including two- and four-cycle spark ignition and compression ignition engines.

A piston 8 is associated with each cylinder and reciprocates within the cylinder between intake, compression, combustion, and exhaust cycles for a four-cycle internal combustion engine. A cylinder head 12 seals the top of the cylinder, and an inner wall 14 of the cylinder head together with the piston top 16 generally define the combustion chamber of the internal combustion engine. An intake valve 22 allows flow of air and fuel through an intake port 24 of the cylinder head and into the combustion chamber. An exhaust valve 26 allows the exhaust to be drawn from the combustion chamber through an exhaust port 28. Each intake valve and exhaust valve slides includes a shaft 32 extending through a valve guide 34 mounted within the cylinder head, and each valve reciprocates between open and closed positions. The valves are driven by a cam shaft (not shown) that controls the timing of the opening and closing of each valve. A spark plug 35 is mounted in the cylinder head extending into the combustion chamber to provide an ignition source for the combustion cycle. Upon combustion, the piston is pushed downward within the cylinder driving a crank shaft (not shown) by a connecting rod 36 attached to the piston by a wrist pin 38.

Figure 2:
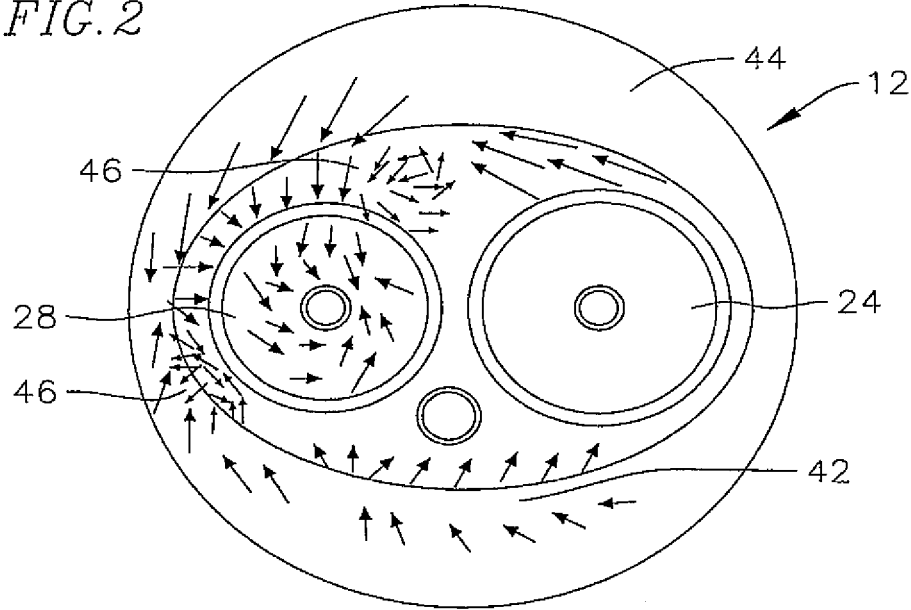
FIG. 2 is a vector flow map for a conventional combustion chamber.

Turning to FIG. 2, a cylinder head 12 is illustrated with arrows showing fluid flow within a conventional combustion chamber. Vaporization areas 42 form around the perimeter of the compression chamber at the squish band 44, while misdirected air and fuel flowing into the combustion chamber from the intake port 24 causes the formation of vortices 46 about the exhaust port 28. This misdirected air disrupts the mixture of the air and fuel causing droplets to form. The resulting liquefied fuel washes into the combustion chamber, slowing the combustion during the combustion cycle, and reducing the air-fuel mixture available to create power during the compression cycle. This also results in incomplete combustion, increasing the emission of undesirable pollutants.

Current industry practice uses exhaust gas treatment components such as catalytic converters, air injection, exhaust gas recirculation (EGR) and oxygen sensors to reduce emissions from unburned fuel. However, according to the present invention, engine performance can be improved by changing the internal surface physics of the combustion chamber and related components. In embodiments of the invention, sharp internal edges are blended or reshaped to reduce the formation of low pressure areas in the intake and exhaust streams. Various textures or machined patterns may be added to the inside surfaces of the combustion chamber and related components. Without being bound by theory, the inventors believe that when the air-fuel mixture passes over the modified surface, a boundary/acceleration layer is formed from the air-fuel charge passing over the modified surface. Within this layer, an adverse pressure gradient develops causing the air-fuel flow to separate from the surface. This layer causes a laminar flow over this surface of the combustion chamber to reduce the separation of the air-fuel mixture. which can occur with conventional technology where the fuel tends to be liquefied near the intake wall. The intake surface, without this modification, normally results in higher air-fuel drag due to the separation of the fuel from the air and droplets of fuel adhering to the intake surface.

By creating such a boundary/acceleration layer, the airflow speed increases, promoting acceleration of the air-fuel mixture toward the combustion chamber. The net result is improved fuel atomization and homogenization with an increase in air-fuel velocity that promotes a cylinder fill rate closer to a positive ratio. The increase in forward momentum also helps to maximize the volumetric air-fuel charge entering the combustion chamber during the intake stroke. This happens dynamically during the intake cycle of the air-fuel charge.

Figure 3:
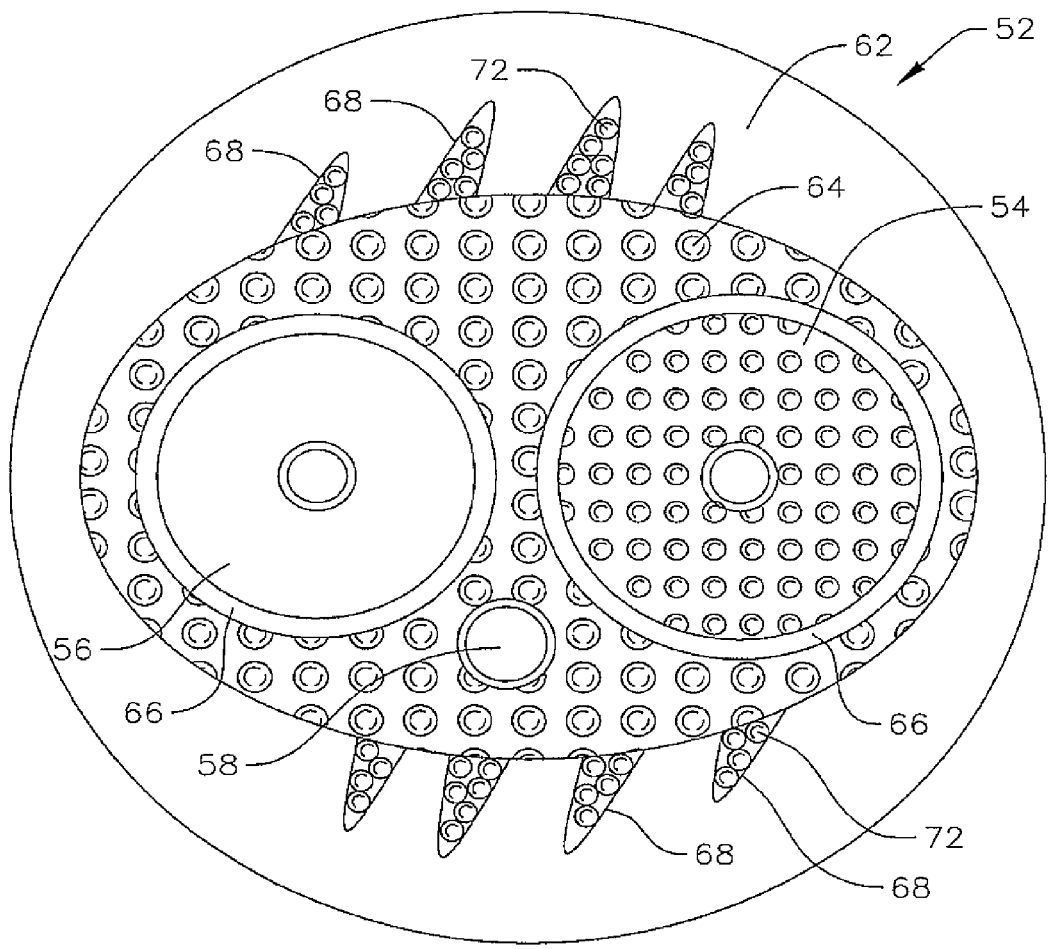
FIG. 3 is a cylinder head of an internal combustion engine according to an embodiment of the invention.

Turning to FIG. 3, a modified cylinder head 52 is illustrated with intake port 54, exhaust port 56, spark plug hole 58, and squish band 62. According to this embodiment, a plurality of dimples 64 are provided across the inner surface of the cylinder head, and across the inner surface of the intake port in order to provide improved air-fuel flow into and within the combustion chamber. In order to maintain proper sealing of the inlet and exhaust valves, valve seating surfaces 66 do not include dimples. Flow grooves 68 are provided around the squish band of the cylinder head, and optionally include additional dimples 72 within the troughs formed by the flow grooves. The inclusion of flow grooves at the squish band reduces the formation of vortices during the intake and compression cycles, and can be designed to force the air-fuel charge to rotate in an appropriate direction to further mitigate the formation of vortices.

Figure 4:
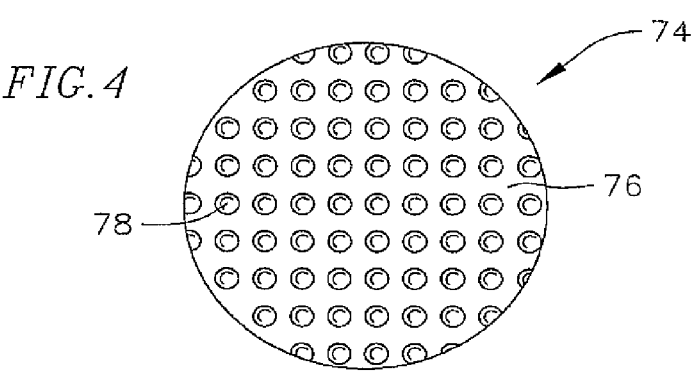
FIG. 4 is an exhaust valve of an internal combustion engine according to an embodiment of the invention.
Figure 5:
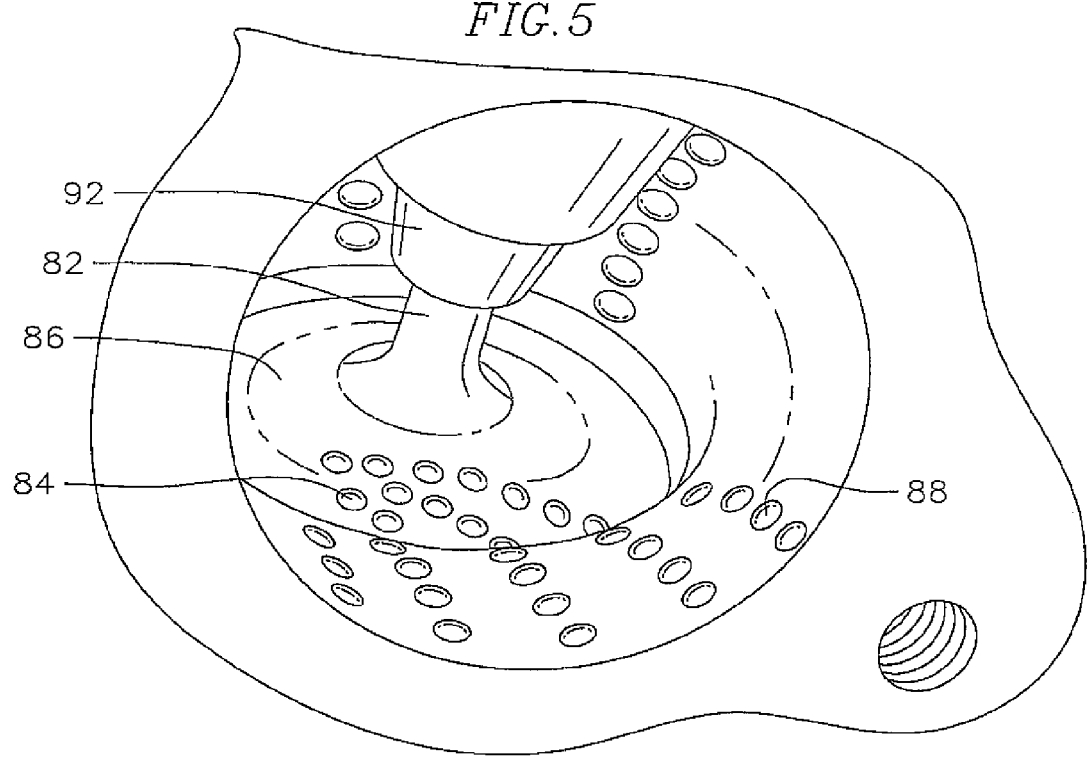
FIG. 5 is an intake port of an internal combustion engine according to an embodiment of the invention.
Figure 6:
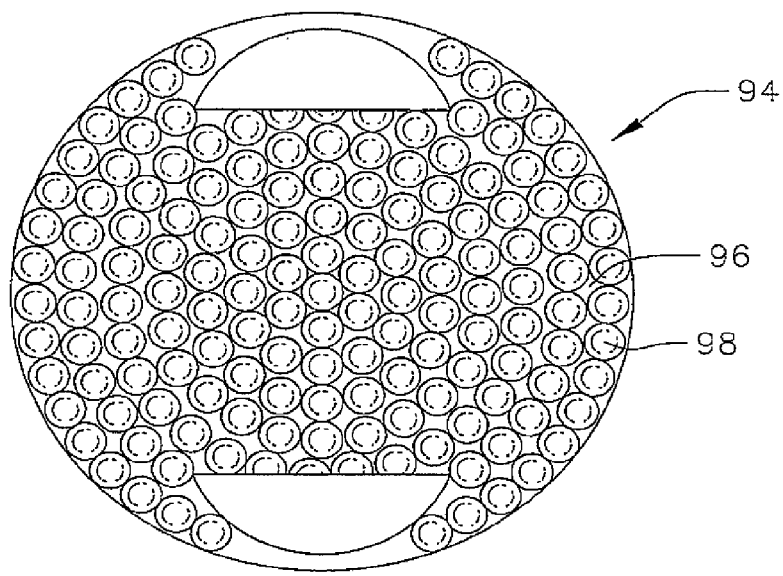
FIG. 6. is a cylinder top of an internal combustion engine according to an embodiment of the invention.

Referring to FIG. 4, in order to further improve flow within the combustion chamber, exhaust valve 74 includes a valve face 76 with a plurality of dimples 78. Referring to FIG. 5, in order to improve flow of the air-fuel mixture into the combustion chamber, intake valve 82 includes still more dimples 84 across its back surface 86. The inner surface of the intake port also includes a plurality of dimples 88. In order to maintain proper valve seating, the dimples do not extend to the portion of the back surface of the valve that abuts the valve seat, nor do the dimples extend to the valve shaft such that they might interfere with the sliding of the valve shaft within the valve guide 92. Turning to FIG. 6, the piston 94 includes a piston top 96 that also includes dimples 98 for improving air-fuel flow within the combustion chamber.

According to other embodiments of the invention, the intake port can be modified to include helical grooves to improve and accelerate air flow to the combustion chamber.

Figure 7:
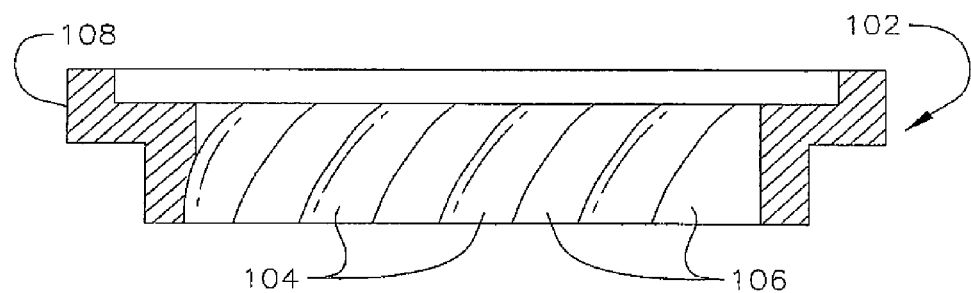
FIG. 7 is a sectional view of a port insert for an internal combustion engine according to an embodiment of the invention.

Referring to FIG. 7, an intake port insert 102 is shown according to an embodiment of the invention. According to this embodiment, the intake port insert is a ring-shaped insert that is designed to be placed between the intake manifold and the entrance to the intake port at the cylinder head (see FIG. 1). The intake port insert includes an inner wall defining a plurality of helical grooves 104 that encourage vortex flow. The grooves may be formed such as by casting or machining the inner wall. Adjacent grooves together form vanes 106 which accelerate the intake air flow velocity. The geometry of the grooves and vanes may be optimized based upon the specific intake assembly to which the intake port insert is used. When placed directly into or between the intake port and intake manifold, the intake port insert accelerates the air-fuel charge directed into the internal combustion engine creating a vortex that causes a "boost effect," drawing more air into the combustion chamber. This can lead better fuel atomization and homogenization which, in turn can lower fuel consumption and increase performance. Furthermore, higher power output can be achieved at lower engine speed with smoother operation.

The angle or pitch of the grooves used in the intake port insert can produce various ranges of improvement in the power output of an internal combustion engine at different operating conditions. As an example, grooves with a finer pitch produce high initial power output at lower internal combustion engine speed. When the groove pitch is coarse, the improved power output is realized at higher internal combustion engine speed. Accordingly, the intake port insert can be customized to improve the flow performance of a specific internal combustion engine's intake system by adjusting the pitch of the grooves. In general, the pitch of the grooves ranges between 15 degrees and 50 degrees. The depth, width, and shape of the grooves are also designed to optimize the acceleration of the intake air to an internal combustion engine.

According to certain embodiments of the invention, u-shaped, v-shaped, or similar shaped grooves are cut on an angle on the interior wall of the intake port insert. Groove spacing can be between about 2.5 mm and about 12 mm depending on the application. The grooves can range between about 2.5 and about 7.5 mm in depth depending on the application. Furthermore, dimpled surfaces can be added to further improve the flow characteristics. The use of dimpled surfaces is especially useful for an internal combustion engine using throttle body fuel injection, a carburetor, or other system where the fuel and air are combined upstream of the intake port.

According to the embodiment of the intake port insert illustrated at FIG. 7, an outer flange 108 of the intake port insert acts as a spacer between the intake port inlet and the intake manifold. However, in other embodiments, the flange can be eliminated, and the intake port insert can be fitted into a corresponding groove provided at either or both the inlet to the intake port, or the outlet from the intake manifold. In still other embodiments, rather than providing the helical grooves on a separate intake port insert, the grooves can be provided directly to either or both of the inlet to the intake port, or the outlet from the intake manifold. For the embodiment where the helical grooves are to be provided directly on the intake manifold, they can be machined after fabrication, or can be incorporated directly into the mold used for making an intake manifold.

Where the helical grooves are provided as a separate intake port insert, materials for fabrication include hard or elastomeric plastics, cast or machined metals, or composite materials of various types. The material selection is based upon its heat transfer characteristics and the optimum location of the intake port insert in the internal combustion engine. According to one embodiment, an intake port insert is fabricated from heat treated aluminum.

According to yet another embodiment, the exhaust port can be modified similarly to include helical grooves to improve and accelerate exhaust flow from the combustion chamber. According to one embodiment, an exhaust port insert substantially identical to the intake port insert of FIG. 7 can be placed between the exhaust manifold and the exhaust port outlet from the cylinder head. In another embodiment, the flange can be omitted and an exhaust port insert can be seated into a corresponding groove provided at either or both the outlet from the exhaust port, or the inlet to the exhaust manifold. In still other embodiments, rather than providing the helical grooves on a separate exhaust port insert, the grooves can be provided directly on either or both of the outlet from the exhaust port, or the inlet to the exhaust manifold.

The inclusion of such helical grooves at the outlet from the exhaust port accelerates the hot exhaust gases by generating a vortex effect, resulting in an increase of power output. A "suction" effect can also be realized which increases the speed of the exhaust gases leaving the combustion chamber at lower engine speed. Furthermore, such a feature brings the internal combustion engine's intake air and exhaust air flow rates closer together to improve overall performance. This minimizes the retention of exhaust gases that can be drawn back into the combustion chamber during any valve overlap as may occur at the end of the exhaust stroke and at the beginning of the intake stroke. During valve overlap, the air-fuel charge may be contaminated with excess exhaust gas, diluting the incoming air-fuel charge. This dilution can cause a reduction in the effective air-fuel charge which in turn can cause a reduction in power output for the internal combustion engine. The geometry and size of the helical grooves provided in the exhaust port outlet generally correspond to those discussed above for the intake port inlet.

The intake and exhaust ports may also be flowed to determine the most efficient direction of the ports and then checked for the percentage of air flow increase at specifics lifts of the camshaft. The exhaust port may be modified for flow enhancement to bring the flow differential between the intake and exhaust ports closer together by maximize the exiting exhaust gases. The blending out of sharp edges and roughening the surface generally contributes to an increase in flow.

According to still other embodiments of the invention, such helical grooves can also be provided at the high-pressure air outlet housing of a turbocharger or supercharger to accelerate the air-fuel charge to the internal combustion engine and improve the efficiency of the turbocharger or supercharger. Such helical grooves can similarly be provided at the exhaust gas exit of a turbocharger to accelerate and improve the exhaust gas flow out of the turbocharger housing, improving the efficiency of the turbocharger.

While dimpled surfaces have generally been illustrated, there are numerous ways to texture the surfaces. Furthermore, while indentations are generally described, protrusions or raised surfaces using similar geometries will also provide good surface physics for the combustion chamber. Possible surface shapes include square, diamond or other polygonal-shaped indentations or protrusions that extend into or from the surface in prismatic, pyramidal, polyhedral or conical shapes, or portions or combinations of such shapes. Excellent results have been shown for a surface textured with round indentations or dimples similar to the dimples on a golf ball. The shapes of the indentations or raised surfaces can generally have a width or diameter ranging from about 1.5 mm to about 9.5 mm in one embodiment. In another embodiment the width or diameter of the shapes generally ranges from about 2.5 mm to about 6.5 mm. The depth or height of the indentations or raised surfaces can range from about 0.5 mm to about 6.5 mm in one embodiment. In another embodiment the depth or height of the indentations or raised surfaces ranges from about 2.5 mm to about 4 mm. In one embodiment, dimples are provided that range in diameter from about 2.5 mm to about 6.5 mm with a depth of from about 2.5 mm to about 4 mm depending on the location in the system.

According to other embodiments, a fuel injection throttle body or a carburetor assembly may be modified similarly with surface textures as described above. In particular, the inclusion of textured surfaces on the throttle body or carburetor assembly provide a larger surface area for the air to be drawn over. Additionally, any sharp surfaces or edges may be blended to improve flow. The effect through the throttle body or carburetor assembly creates an increase in available air for the engine. The textured surface may be provided at the air inlet of the filter, continuing up to and including the throat or entrance of the carburetor or throttle body. This increased air flow enhances the mixing effect at the point where fuel is introduced.

According to still other embodiments of the invention, certain surfaces of the internal combustion engine may be coated with a thermal barrier coating. When applied around the combustion chamber, such thermal barrier coatings can reduce the heat transfer away from the cylinder head and re-direct the heat back in to the combustion chamber to reduce a quenching effect and direct the subsequent combustion heat out the exhaust port. Examples of suitable thermal barrier coatings include aluminum-filled metallic ceramic coatings such as those made by Tech Line Coatings, Inc. under the product names Tech Line CBC-2 and Tech Line CBX.

Figure 8:
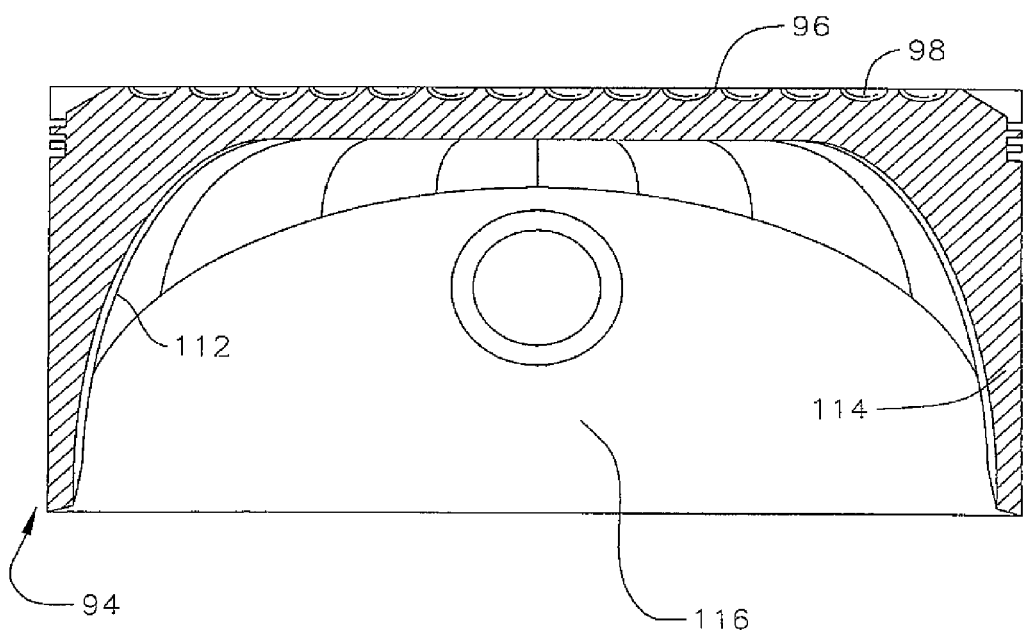
FIG. 8 is a sectional view of a piston of an internal combustion engine according to an embodiment of the invention.

Referring to FIG. 8, a sectional side view of a piston 94 is illustrated. The piston includes a piston top 96 with dimples 98 as discussed above. The modified piston top and the inner surfaces 112 of the piston skirt 114 and wrist pin side surfaces 116 of the piston can include similar thermal barrier coatings. Pistons coated with barrier coatings tend to run cooler, have less thermal growth and retain much more of their tensile strength. Barrier coatings also protect against high temperature oxidation, reduce hot spots, and encourage proper flame travel. The barrier coating also spreads the heat evenly over the entire coated surface, reducing detonation and pre-ignition, allowing the use of lower octane fuel. Furthermore, less heat is conducted through the wrist pins and connecting rods keeping the crank, bearings, oil and entire bottom end of the internal combustion engine cooler. The outer surface 118 of the piston skirts can optionally be coated with a solid film lubricant. One example of a suitable lubricant is made by Tech Line Coatings, Inc. under the name TLTD.

In addition such thermal barrier coatings may be applied to the intake port inserts and exhaust port inserts described above. Both inside and outside surfaces of such inserts may be coated. Use of such coatings on the intake port inserts can reduce the heat transfer between the hot cylinder head and the intake manifold and can reduce thermal heat transfer into the air stream from the internal combustion engine.

Additionally, the interior surface of the exhaust port inserts may optionally be heat treated to improve the thermodynamics of the exhaust port inserts. To further improve the efficiency, the interior of the exhaust port inserts may be coated with thermal barrier treatments as described above to retain the transfer of heat from the exhaust manifold in the exhaust pipes. By maintaining the heat transfer from the cylinder head exhaust port, the exhaust gases remain hot and minimize the effect of cooled exhaust gas. If the exhaust gases cool too quickly, the gases become heavier causing them to slow down. The cooled gases can further create a back pressure at the port, causing exhaust gas to re-enter the combustion chamber on valve overlap.

Figure 9:
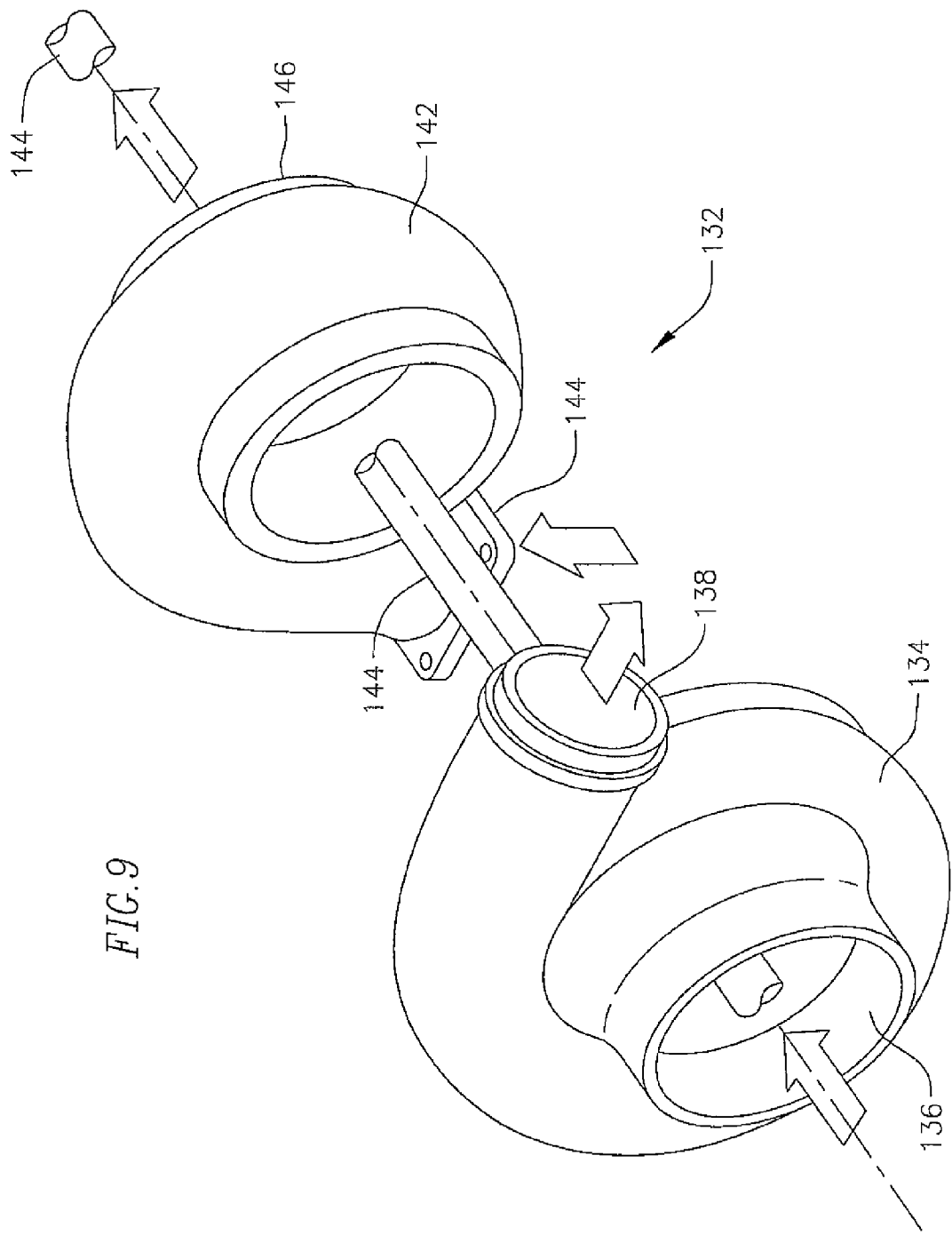
FIG. 9 is a partially exploded schematic illustration of a turbocharger for an internal combustion engine according to an embodiment of the invention.

According to still another embodiment of the invention, an improved turbocharger is provided. Referring to FIG. 9, a turbocharger 132 includes a compressor housing 134 which houses a compressor wheel (not shown) for boosting the pressure of ambient air. The air enters the housing through an air inlet 136, is compressed by the compressor wheel, and exits thorough a compressor outlet 138 at an elevated pressure. A turbine housing 142 adjacent the compressor housing uses exhaust gas at elevated pressure from the internal combustion engine to turn a turbine (not shown) that is directly linked to the compressor wheel by a common shaft 144. The exhaust gas enters the turbine housing at an exhaust gas inlet 144, and exits the turbine housing through the turbine exhaust gas outlet 146.

Figure 10:
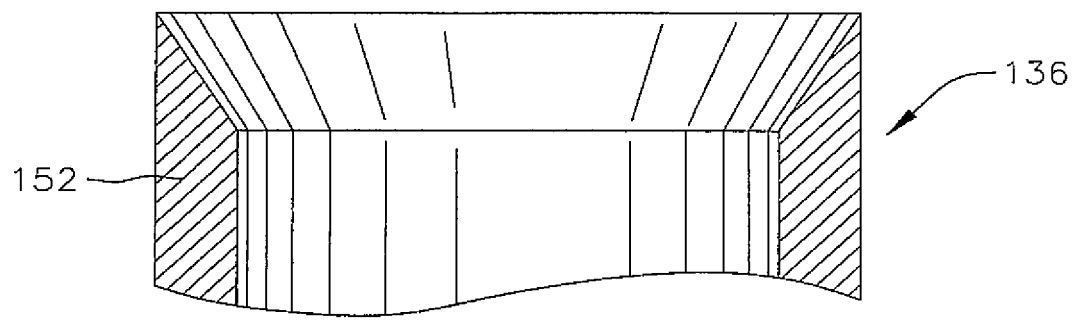
FIG. 10 is a sectional view of a turbocharger air inlet for an internal combustion engine according to an embodiment of the invention.
Figure 11:
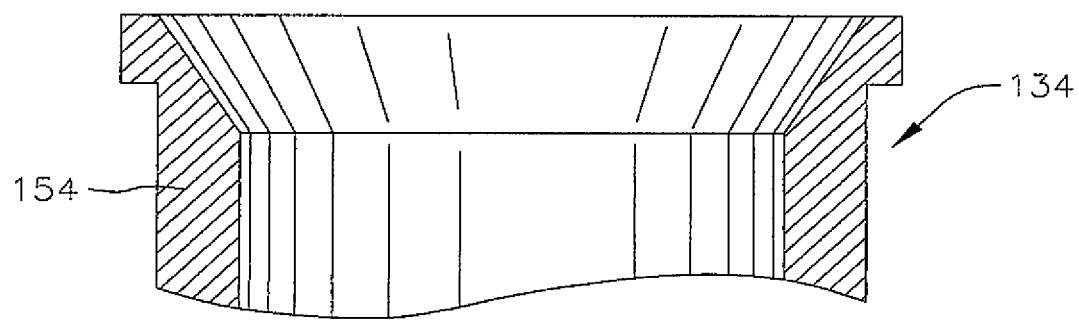
FIG. 11 is a sectional view of a turbocharger compressor outlet for an internal combustion engine according to an embodiment of the invention.

According to an embodiment of the present invention as shown in FIG. 10, the air inlet 136 includes a blended or tapered wall 152 in which the inner edge is blended towards the outer edge to improve the inlet air flow and increase the available volume on the compressor side of the turbocharger. As shown in FIG. 11, the compressor outlet 134 similarly includes a tapered wall 154 to improve the outlet air flow. In particular, modifying the compressor exit side of the compressor housing increases the speed, volume, and pressure of the air delivered by the turbocharger to the intake manifold. This improves the internal combustion engine's response at lower rpm. The tapered wall blends towards the connection pipe between the compressor and the intake manifold.

Figure 12:
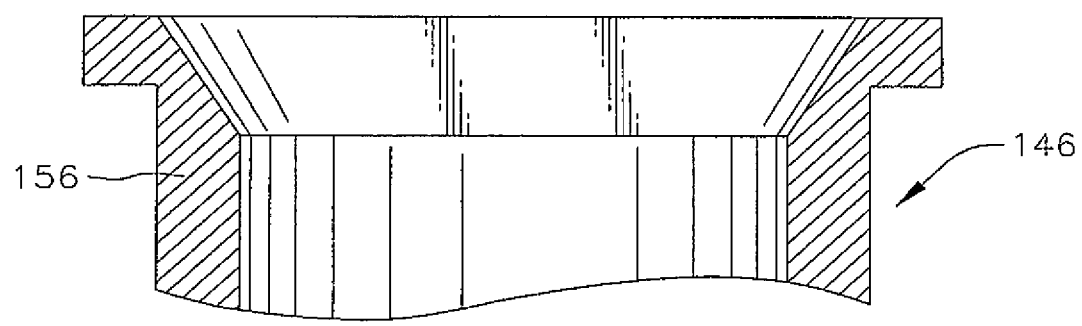
FIG. 12 is a sectional view of a turbocharger exhaust gas inlet for an internal combustion engine according to an embodiment of the invention.

In yet another embodiment as shown in FIG. 12, the exhaust gas inlet 146 of the turbine housing also includes a tapered wall 156 to similarly improve the flow characteristics. Though not shown, the exhaust gas outlet can also include a tapered wall virtually identical to the tapered wall 152 of the air inlet 136 as shown in FIG. 10. Such modifications increase the speed of the exhaust gases through the turbine, improving the energy transferred to the compressed air.

Figure 13:
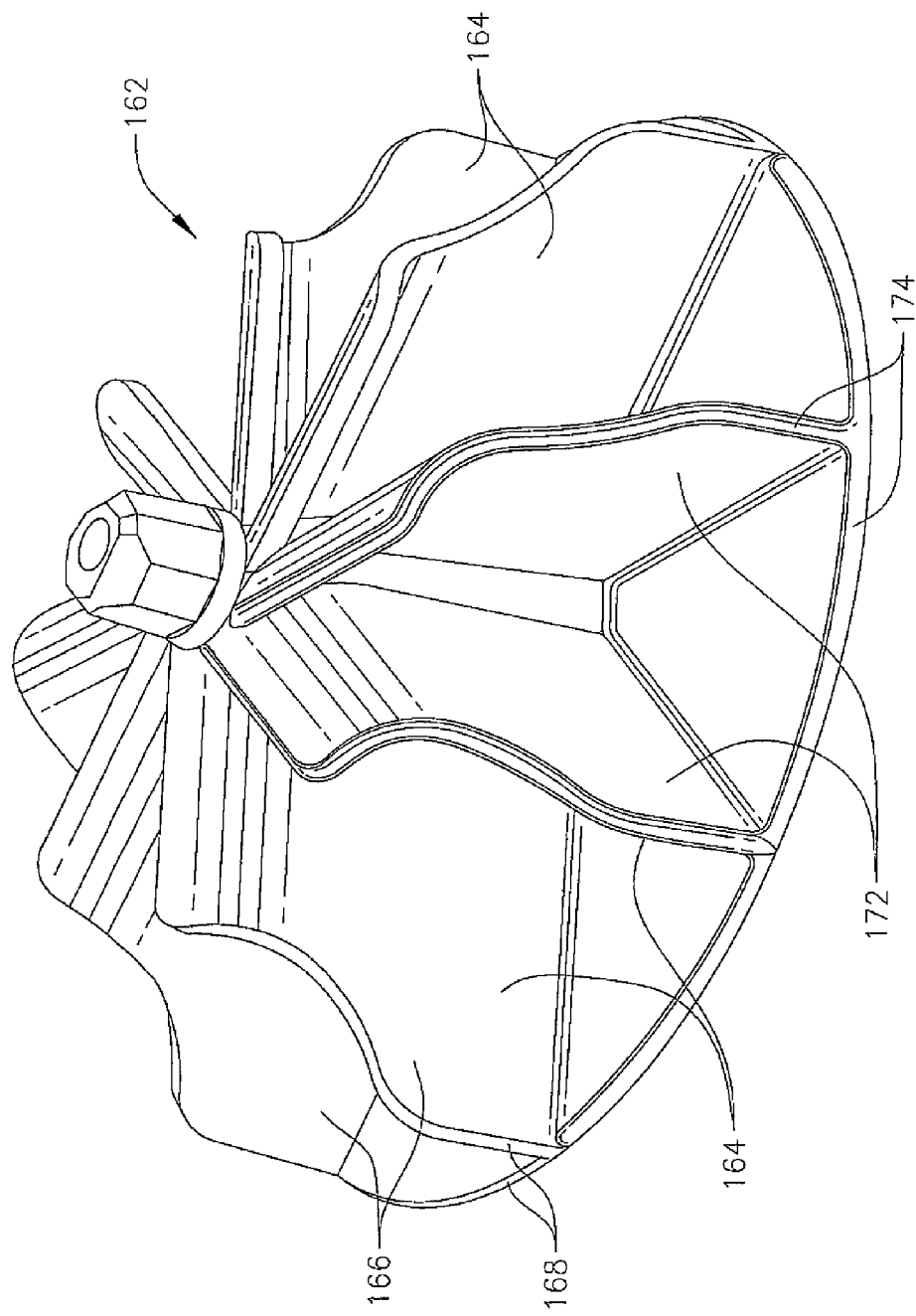
FIG. 13 is a turbocharger turbine for an internal combustion engine according to an embodiment of the invention.

In still other embodiments, one or both of the compressor wheel and turbine can be modified to improve the turbocharger's efficiency. Referring to FIG. 13, a partially modified compressor wheel 162 is illustrated. The compressor wheel includes a plurality of vanes 164 which compress the air within the compressor housing. While conventional vanes 166 generally include squared edges 168 with sharp corners, according to an embodiment of the invention, the modified vanes 172 include rounded edges 174. By rounding and contouring the edges to eliminate sharp edges, the surface drag of the air against the vanes is lowered, increasing the speed of the compressed air toward the intake system, and improving the turbocharger efficiency. Though not shown, a conventional turbine wheel is of a design similar to a compressor wheel, and includes vanes with generally square edges. According to yet another embodiment of the invention, the square edges on the vanes of the turbine wheel are rounded and contoured to eliminate sharp edges. This reduces surface drag of the exhaust gas against the turbine wheel vanes, increasing the speed of the exhaust gas through the turbine housing and improving turbocharger efficiency.

Test results for an unmodified turbocharger show the intake temperature started at 41° C., then climbed to 97° C. After the modifications, the intake air peaked at 44° C. This netted a 3° C. differential between the ambient air and the intake air temperature. A lower intake air temperature generally results in increased air density which leads to improved fuel efficiency and increased power output.

According to still another embodiment of the invention, thermal barrier coatings can be applied to the inside surfaces of the compressor housing 134 of a turbocharger 132 to block heat transfer, thereby maintaining a lower temperature during the compression process. Similarly, thermal barrier coatings can be applied to the inner and outer surfaces of the turbine housing 142 to maintain the heat inside the turbine housing. To further minimize the heat transfer between the compressor housing and the exhaust housing, a thermal barrier coating may be applied to the outer surfaces of a central bearing housing (not shown) between the compressor housing and turbine housing. The use of such a coating extends the life of the bearings and seal components and reduces the heat transfer between the turbine housing and compressor housing. In still other embodiments of the invention, one or both of the compressor wheel and turbine wheel can be coated with thermal barrier coatings to reduce heat transfer between the turbine housing and compressor housing.

Suitable thermal barrier coatings include ceramic thermal barrier coatings. In certain embodiments, commercially available barrier coatings Tech Line's CBX or CBC-2 coatings may be used on the central bearing housing and the exterior surface of the turbine housing of the turbocharger. The compressor wheel and turbine wheel may similarly be coated with CBX for thermal control. Tech Line's TLHB Hi Heat Coating may be used to coat the inside surfaces on the turbine housing of the turbocharger. While specific Tech Line products are mentioned, other equivalent or similar products are available from other commercial manufacturers, and may also be used.

The mechanical modifications and the application of thermal barrier coatings to various components of a turbocharger improve the turbocharger's performance through the entire RPM band. Improvements can include faster turbo response and improved low to mid-range throttle response. The application of thermal barrier coatings on the compressor-side, turbine-side and bearing housings provide thermal control which maximizes the overall efficiency. Tests have shown that the systematic application of this technology can result in a 5%-35% reduction in fuel consumption due to the reduction in throttle input required for a given power output compared to a non-modified turbocharger. This results in more oxygen in the intake system at less throttle which improves power output, increases fuel mileage, and reduces tail pipe emissions. The lower air temperatures achieved by use of the invention may also allow the use of a smaller intercooler, and could even eliminate altogether the need for an intercooler, reducing the corresponding pressure loss associated with an intercooler.

While these embodiments are directed to turbocharger modifications, the modifications to the compressor side of the turbocharger could also be applied to a supercharger or other types of air pressure boosters for internal combustion engines. A supercharger includes an air compressor that, rather than being driven by exhaust gas flowing through a turbine, is driven directly by the internal combustion engine such as by a belt linked to the crank shaft. In particular, the compressor wheel of a supercharger can be modified to replace any sharp edges with rounded and contoured edges as illustrated for the turbocharger at FIG. 13. The air inlet and compressor outlet of a supercharger can be modified to include tapered walls as illustrated for the turbocharger at FIGS. 9 and 10. Similarly, thermal barrier coatings can be applied to the compressor housing and bearing housings of a supercharger to provide similar benefits.

Advantages of the various embodiments of the present invention include the ease with which existing internal combustion engine technology may be modified. Existing components of the internal combustion engine, turbochargers, and superchargers can be machined using conventional metal working tools to include one or more embodiments of the present invention. The thermal compounds used in this invention are commercially available products.

One significant benefit of embodiments of this invention is an increase in engine efficiency. The increase in efficiency can be described as the increase of output power with lower fuel consumption. Another way of describing efficiency is a decrease in fuel consumed with equivalent or greater power output. The application of this technology has shown increases in efficiency by 15% to over 40%, depending on the application. This is accomplished by using less throttle input to achieve a power output that would normally require a wider throttle input.

On a manufacturer's level, the application of this invention or technology is nearly transparent and very cost effective. The tooling changes required to incorporate the dimples and surface textures are low compared to the increases in performance that may be attained. The net result is lower fuel consumption and lower emission levels. Overall manufacturing costs may decrease to the extent fewer or less complicated emission devices may be required. The invention may also contribute to a higher overall product reliability.

Example 1

A Cummins ISM heavy duty diesel engine with the Electronic Control Module (ECM) set to produce 400 Hp and 1250 lb-ft was used as a test engine. This is a commonly used on-road truck engine. The engine was tested from a stabilized hot start using the test protocol in accordance with the "transient cycle" Federal Test Procedure (FTP) established by the United States Environmental Protection Agency. The FTP heavy-duty transient cycle test is currently used for emission testing of heavy-duty on-road engines in the United States, and was developed to take into account the variety of heavy-duty trucks and buses in American cities, including traffic in and around the cities on roads and expressways. The FTP transient test is based on the Urban Dynamometer Driving Schedule (UDDS) chassis dynamometer driving cycle. The cycle includes "motoring" segments and requires an electric dynamometer capable of both absorbing and generating power. The transient cycle consists of four phases: the first is a New York Non Freeway (NYNF) phase typical of light urban traffic with frequent stops and starts. The second is a Los Angeles Non Freeway (LANF) phase typical of crowded urban traffic with few stops. The third is a Los Angeles Freeway (LAFY) phase simulating crowded expressway traffic in Los Angeles. The fourth phase repeats the first NYNF phase. There are few stabilized running conditions, and the average load factor is about 20 to 25% of the maximum horsepower available at a given speed.

A baseline test was first performed on the stock un-modified engine. After the baseline test was completed the engine was modified using several features of the present invention. In particular, the test engine included a cylinder head modified to include dimples, intake and exhaust port inserts, and turbocharger modifications as set forth above.

Emissions data from the testing is set forth in the following table:

| | Work | Weighted Emissions (g/bhp-hr) | | | | | | | Fuel Use |
|---|---|---|---|---|---|---|---|---|---|
| | (bhp-hr) | HC | CO | NOx | NO | CO$_2$ | NMHC | PM | (lb/bhp-hr) |
| Base | 27.2 | 0.172 | 1.201 | 3.982 | 3.846 | 573.17 | 0.169 | 0.082 | 0.3707 |
| Test | 27.3 | 0.184 | 1.225 | 3.920 | 3.845 | 552.28 | 0.181 | 0.071 | 0.3683 |
| % Difference. | | 6.977 | 1.998 | −1.557 | −0.026 | −3.645 | 7.101 | −13.415 | −0.647 |

The results show that the present invention can improve the performance of the engine while reducing particulate matter (PM), oxides of nitrogen (NOx) and carbon dioxide (CO$_2$) within the constraints of the ECM program. The results also suggest that by tailoring the ECM mapping to the subject technology, even greater benefits can be achieved. In particular, the increased hydrocarbon (HC), non-methane hydrocarbon (NMHC) and carbon monoxide (CO) results tend to show an over-rich fuel mixture. By mapping the ECM for a leaner burn, the efficiency of the engine can be improved. Furthermore, because the engine is limited by the ECM to the specified horsepower and torque, the test does not show the improved horsepower and torque potential that have been realized in field testing.

Figure 14:
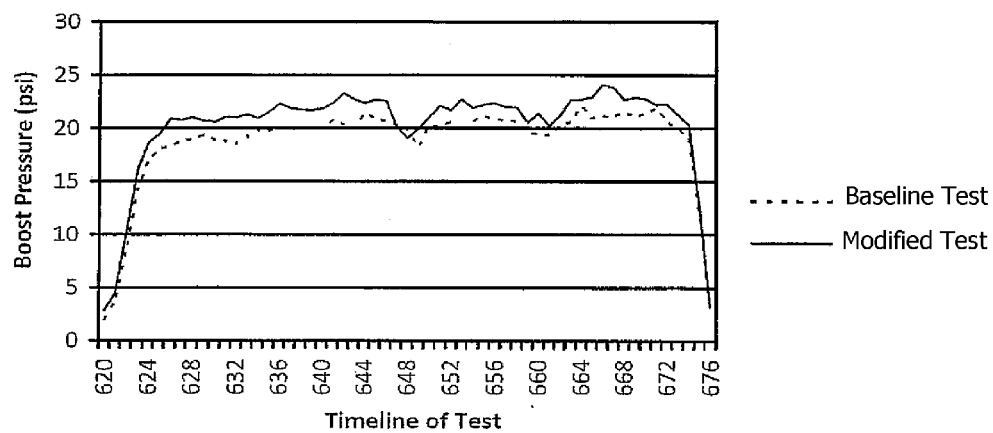
FIGS. 14 through 16 are charts illustrating improved engine performance using embodiments of the present invention.
Figure 15:
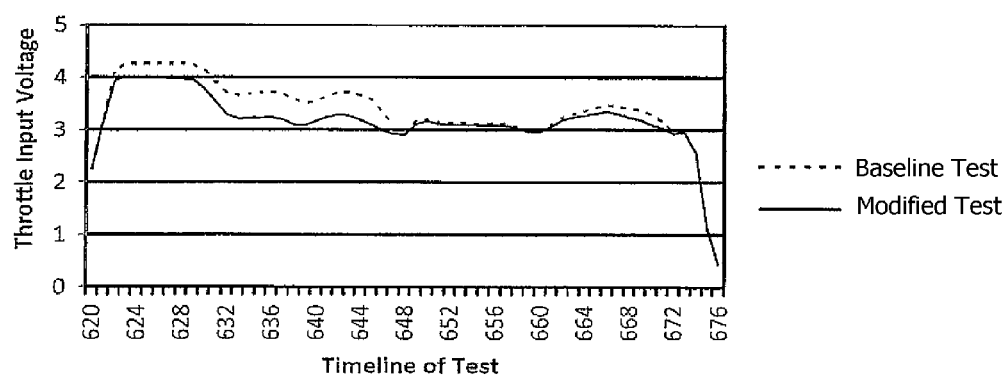

FIGS. 14 and 15 illustrate the turbo boost pressure and throttle output voltage for a portion of the LAFY phase of the test. These charts show the relationship between throttle requirements to meet the demands of the test procedure and the response of the turbocharger. Overall, the turbo boost pressure of the test engine was at or higher than the turbo boost pressure of the unmodified engine during the entire test procedure. Similarly, the throttle output voltage for the test engine was generally at or lower than that of the unmodified engine during the entire test procedure. However, the most pronounced improvement was generally seen during the phases of the test that included periods of heavy load. During such periods, the modified engine required significantly less throttle to meet the demand and the turbocharger responded quicker and built more boost showing an increase in the total efficiency of the engine.

Furthermore, the tests show that the technology of the present invention held engine temperatures lower on average, contributing to a reduction in NOx emissions. Typically an increase of engine efficiency and reduced fuel consumption will result in an increase in temperature and an increase in NOx emissions.

Example 2

For Example 2, a turbo-charged Cummins 5.9 liter diesel engine was modified according to features of the present invention. In particular, the engine was modified to include dimples and flow grooves on the cylinder heads, dimples on the piston tops, the exhaust valve faces, the intake ports, and the back surfaces of the intake valves, inserts with helical grooves at the high-pressure air outlet of the turbocharger, modified compressor and turbine wheels as explained above, tapered walls on the compressor inlet and outlet, and on the turbine inlet and outlet of the turbocharger, and thermal barrier coatings as explained above. However, prior to these modifications, the unmodified engine was "mapped" by mounting the engine to a dynamometer and measuring the peak torque and horsepower generated at the engine's primary output shaft at various engine speeds. The engine was then modified as explained above, again mounted to the dynamometer, and mapped a second time. The protocol for such engine mapping is based on the EPA revised regulations 40 CFR §1065.510.

Figure 16:
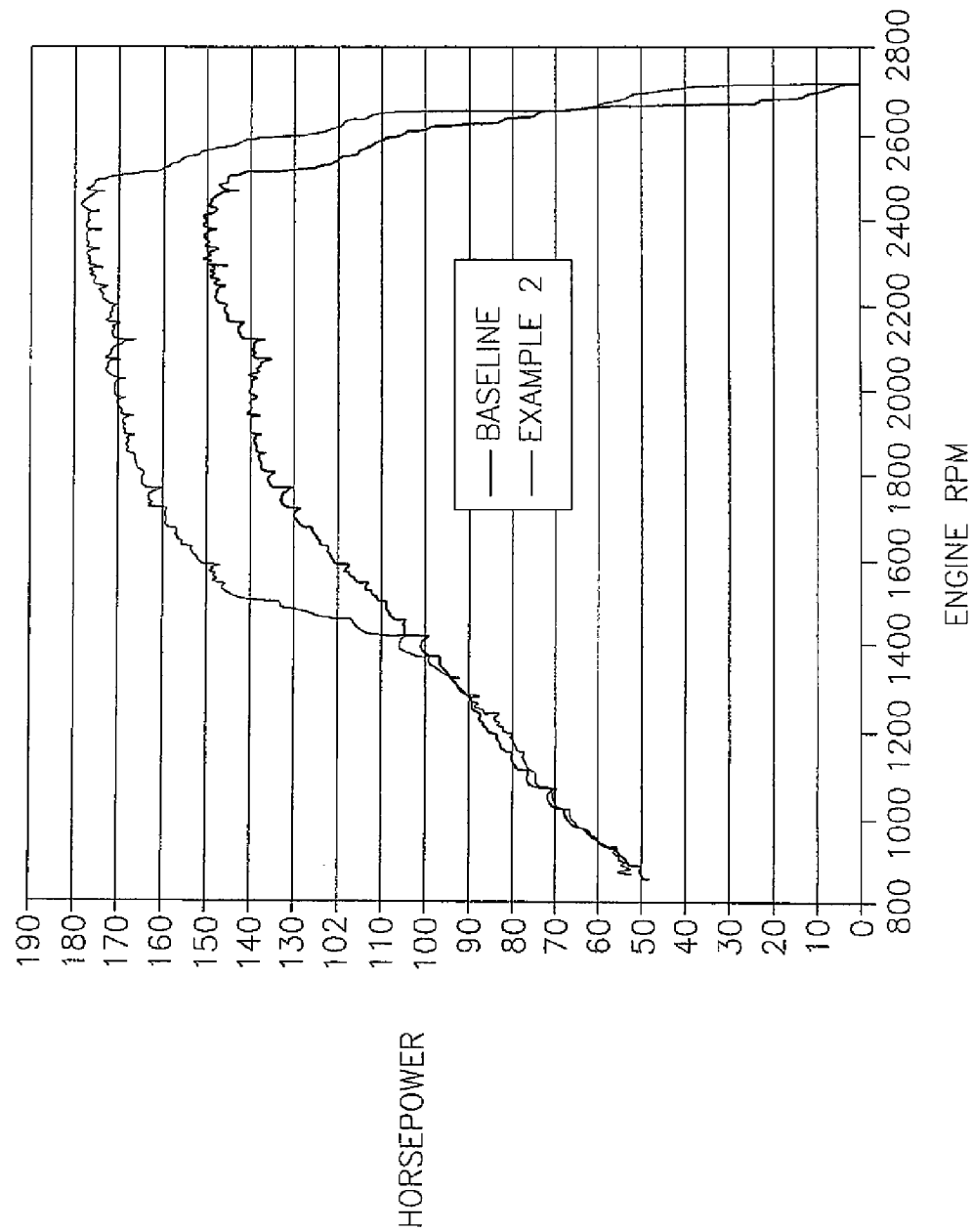

FIG. 16 illustrates the power output portion of the results of this engine mapping where, for each of the unmodified engine and the engine of Example 2, the peak horsepower output of the engine is graphed at various engine speeds. The engine mapping shows that engine modifications of embodiments of the present invention can result in a 25% increase in torque at 1600 RPM and an 18% increase in horsepower at 2500 rpm.

Specific embodiments of the invention have been illustrated, many of which are directed to four-cycle spark ignition engines. However, the various features may be applied to other types of engines including two-cycle spark ignition engines, and two- or four-cycle compression ignition engines.

What is claimed is:

1. An internal combustion engine comprising:
   at least one cylinder;
   at least one piston received in the at least one cylinder;
   at least one cylinder head coupled to the at least one cylinder defining at least one intake port and at least one exhaust port;
   a combustion chamber defined by the at least one cylinder head and a top of the at least one piston;
   at least one intake valve corresponding to the at least one intake port;
   at least one exhaust valve corresponding to the at least one exhaust port;
   an intake manifold adapted to supply air to the combustion chamber;
   a fuel supplier comprising one or more fuel injectors or one or more carburetors adapted to supply fuel to the combustion chamber; and
   an exhaust manifold adapted to direct a flow of exhaust gas from the combustion chamber, wherein
   at least one of the at least one cylinder head, the at least one intake valve, or the at least one exhaust valve includes a surface comprising a plurality of surface features arranged in a matrix pattern, wherein a center of each one of the plurality of surface features on the surface is spaced apart from a center of another one of the plurality of surface features on the surface.

2. The internal combustion engine of claim 1, wherein the surface features are selected from the group consisting of indentations, protrusions, and combinations thereof.

3. The internal combustion engine of claim 1, wherein a plurality of the surface features are substantially the same size.

4. The internal combustion engine of claim 1, wherein the matrix pattern is a rectilinear grid.

5. The internal combustion engine of claim 1, wherein the matrix pattern is a contoured grid.

6. The internal combustion engine of claim 1, wherein the surface features are selected from the group consisting of dimples, prismatic shapes, pyramidal shapes, polyhedral shapes, conical shapes, portions of such shapes, and combinations thereof.

7. The internal combustion engine of claim 1, wherein a plurality of the surface features have an average width of about 1.5 to about 9.5 mm, and an average depth or height of about 0.5 to about 6.5 mm.

8. The internal combustion engine of claim 1, further comprising a plurality of grooves generally located about a perimeter of a squish band defined by the cylinder head.

9. The internal combustion engine of claim 8, further comprising a plurality of surface features in each of the plurality of grooves.

10. The internal combustion engine of claim 1, further comprising a plurality of helical grooves located at at least one of the intake port, the exhaust port, an interface between the intake manifold and the cylinder head, or an interface between the exhaust manifold and the cylinder head.

11. The internal combustion engine of claim 10, further comprising a plurality of surface features within the helical grooves.

12. The internal combustion engine of claim 1, further comprising a thermal barrier coating on a surface of at least one of the at least one cylinder, the at least one cylinder head, the at least one piston, the at least on intake valve, the at least one exhaust valve, the intake manifold, or the exhaust manifold.

13. The internal combustion engine of claim 1, further comprising an air pressure booster selected from a turbocharger and a supercharger.

14. The internal combustion engine of claim 10, wherein the helical grooves have a pitch from approximately 15 degrees to approximately 50 degrees.

15. The internal combustion engine of claim 10, wherein the helical grooves are u-shaped or v-shaped in cross-section.

16. The internal combustion engine of claim 10, wherein spacing between adjacent ones of the plurality of helical grooves is from approximately 2.5 mm and approximately 12 mm.

17. The internal combustion engine of claim 10, wherein a plurality of the helical grooves have an average depth from approximately 2.5 mm and approximately 7.5 mm.

18. The internal combustion engine of claim 10, wherein the helical grooves are integral to at least one of the intake manifold, the exhaust manifold, or the cylinder head.

19. The internal combustion engine of claim 10, wherein the helical grooves are defined in a removable insert.

* * * * *